H. S. CAMPBELL.
DRAFT THILL.
APPLICATION FILED OCT. 8, 1913.
1,202,027.
Patented Oct. 24, 1916.
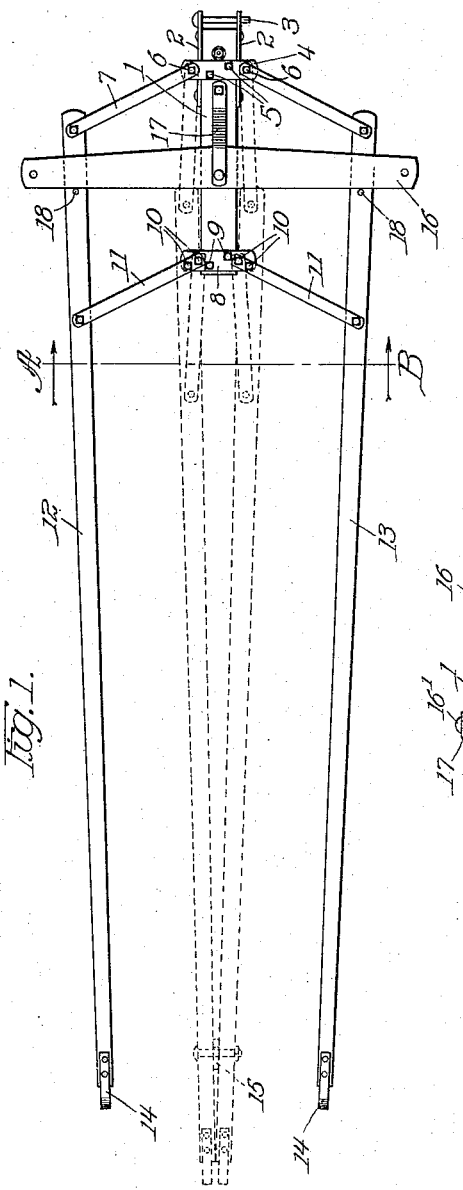
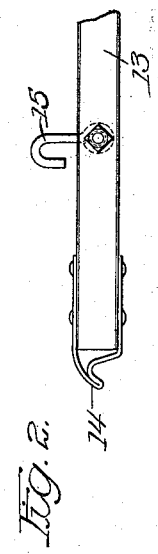
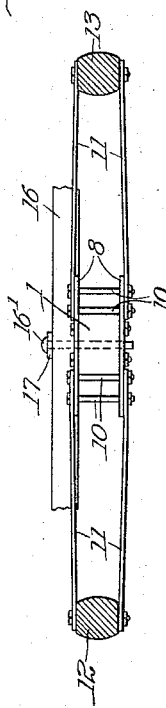
Witnesses:
F. W. Hoffmister
E. W. Burgess
Inventor
Henry S. Campbell
by Chas. E. Lord
Atty.

UNITED STATES PATENT OFFICE.

HENRY SPICER CAMPBELL, OF CHICAGO, ILLINOIS, ASSIGNOR TO INTERNATIONAL HARVESTER CORPORATION, A CORPORATION OF NEW JERSEY.

DRAFT-THILL.

1,202,027.  Specification of Letters Patent.  Patented Oct. 24, 1916.

Application filed October 8, 1913. Serial No. 794,141.

*To all whom it may concern:*

Be it known that I, HENRY SPICER CAMPBELL, a citizen of the United States, residing at Chicago, in the county of Cook and State of Illinois, have invented certain new and useful Improvements in Draft-Thills, of which the following is a full, clear, and exact specification.

My invention relates to draft thills to be used with three draft animals, and to means whereby the position of the thill members may be readily adjusted to a position whereby they become operative as a draft tongue to be used with two draft animals.

The object of my invention is to provide a construction rigid and strong in either position of its adjustment, comprising few parts, and efficient in operation. I attain these objects by means of the mechanism illustrated in the accompanying drawings, in which—

Figure 1 represents a top plan view of a draft mechanism having my invention embodied in its construction; Fig. 2 is a side elevation of one end of one of the thill members on an enlarged scale; and Fig. 3 is a cross section of Fig. 1 on an enlarged scale and along line A—B.

Referring to the drawings, like reference characters designate the same parts throughout the several views.

1 represents a primary draft member having its rear end adapted to be connected to a vehicle, as by means of straps 2 secured thereto upon opposite sides thereof, and adapted to receive a connecting pin 3.

4 represents transversely disposed clip members secured to the top and bottom of member 1 near its rear end, as by means of bolts 5, and projecting beyond the opposite sides thereof are provided with vertically disposed openings for the reception of bolts 6 whereby the clips are pivotally connected with the inner ends of spaced draft frame members 7.

8 represents clip members secured to member 1 at its front end, upon its top and bottom sides, as by means of bolts 9, and projecting beyond its opposite sides are provided at each end with two vertically arranged openings that receive bolts 10, spaced apart transversely, whereby the clips are secured to the inner ends of spaced draft frame members 11 disposed parallel with members 7.

12 and 13 represent right and left thill members, respectively, that are received between the opposite ends of draft frame members 7 and 11, the thill members being provided at their front ends with neckyoke connecting members 14, and near their front ends with other neckyoke or holdback hooks 15, and 16 represents a two-horse draft evener connected at its middle with the draft member 1 by means of a pin $16^1$ and a hammer strap member 17.

When the various parts of the mechanism are in the position shown by full lines in Fig. 1, the device is adapted for use with three animals, one to be placed between the thill members 12 and 13, and one outside each thill member. When it is desired to adjust the mechanism for use with two draft animals, one of the bolts 10 at opposite ends of the clip members 8 is removed. The thill members may be then turned forward and folded inward in a fore and aft direction and in a horizontal plane, with their rear ends against opposite sides of the front of member 1, and with the members 7 and 11 disposed substantially parallel with the member 1, and with the line of draft as shown by dotted lines in Fig. 1, and they may be secured in such position by replacing the bolts 10, previously removed, through the clips 8 and openings 18 near the rear ends of the thill members 12 and 13.

The forward ends of the thills are then secured in place by means of a bolt which carries the neck yoke hook 15, and the position of the evener bar 16 need not be changed even though the thills have been lengthened by the forward and inward movement thereof. When the thills are moved apart for three horses the end pieces 14 will serve as the neck yoke hooks, and part 15 may be removed entirely.

Having shown and described one form of my invention, I do not wish it to be confined to the precise details of construction as herein illustrated, as it is understood that many minor changes may be made in the structure without departing from the spirit of my invention.

What I claim as my invention, and desire to secure by Letters Patent, is:

1. In a draft mechanism, the combination of a draft member to be connected to a vehicle, holding members secured to opposite ends of said draft member, parallel draft frame members pivoted to said holding members, and thills pivotally connected to said draft frame members.

2. In a draft device, a primary draft member, thill members, and pivotally mounted longitudinally spaced fore and aft parallel draft frame members for pivotally connecting said thill members to the primary draft member.

3. In a draft mechanism, in combination, a primary draft member having means whereby it may be connected to a vehicle, and thill members disposed upon opposite sides of said draft member and connected therewith by means of fore and aft horizontally spaced parallel draft frame members that may be swung in a fore and aft direction and in a horizontal plane.

4. In a draft device, a primary draft member, thill members, parallel swinging links for connecting said thill members to the primary draft member horizontally spaced fore and aft, and means for locking said links against swinging movement when the thill members are spaced apart.

5. In a draft mechanism, in combination, a primary draft member having means whereby it may be connected with a vehicle, thill members disposed upon opposite sides of said draft member, fore and aft horizontally spaced parallel draft frame members having their opposite ends pivotally connected with said draft member and said thills, whereby said thills may be swung in a fore and aft direction toward or from said draft member, and means for securing said thills in either position of adjustment.

6. In a draft mechanism, in combination, a primary draft member having means whereby it may be connected with a vehicle, clips secured to opposite ends of said draft member and upon the top and bottom sides thereof, parallel draft frame members having their inner ends pivotally connected with the opposite ends of said clips, thills pivotally connected with the opposite ends of said draft frame members, and releasable means for securing said frame members against pivotal movement.

7. In a draft mechanism, in combination, a primary draft member having means whereby it may be connected with a vehicle, clips secured to opposite ends of said draft member and upon the top and bottom sides thereof, draft frame members having their inner ends pivotally connected with the clips upon the rear end of said draft member and their opposite ends with the rear ends of thill members disposed upon opposite sides of said draft member, draft frame members having their inner ends secured to the clips upon the front end of said draft member and their opposite ends pivotally connected with said thills and disposed in parallel relation with said first named draft frame members, and means connected with the clips upon the front ends of said draft member and said draft frame members permitting said thills to be swung forward or from said draft member in a fore and aft direction and operative to secure them in either position of adjustment.

In testimony whereof I affix my signature, in the presence of two witnesses.

HENRY SPICER CAMPBELL.

Witnesses:
 EVAN EVANS,
 C. H. MANGOLD.

Copies of this patent may be obtained for five cents each, by addressing the "Commissioner of Patents, Washington, D. C."